United States Patent
Chuang

(10) Patent No.: US 9,432,837 B2
(45) Date of Patent: Aug. 30, 2016

(54) METHOD OF ACCESSING CONTACT FEATURES IN SMARTCARDS

(71) Applicant: ACER INCORPORATED, New Taipei (TW)

(72) Inventor: Chia-Yun Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/710,613

(22) Filed: May 13, 2015

(65) Prior Publication Data

US 2016/0044492 A1   Feb. 11, 2016

(30) Foreign Application Priority Data

Aug. 11, 2014   (TW) .............................. 103127522 A

(51) Int. Cl.
*H04W 8/18* (2009.01)
*G06F 17/30* (2006.01)
*H04W 4/00* (2009.01)

(52) U.S. Cl.
CPC ........ *H04W 8/183* (2013.01); *G06F 17/30312* (2013.01); *G06F 17/30598* (2013.01); *H04W 4/001* (2013.01)

(58) Field of Classification Search
CPC ..................................................... H04W 8/183
USPC .......................................................... 455/558
See application file for complete search history.

(56) References Cited

U.S. PATENT DOCUMENTS 6,501,962 B1 * 12/2002 Green ................... H04W 8/205
                                                      455/186.1
8,060,140 B2 * 11/2011 Tak ................... G06F 17/30067
                                                      455/558

* cited by examiner

*Primary Examiner* — Michael Neff
(74) *Attorney, Agent, or Firm* — Winston Hsu; Scott Margo

(57) ABSTRACT

During a booting procedure when reading the contact features of a smartcard, the body part of a master elementary file is accessed. According to the validity and link of each data, the body part of a Type 1 elementary file, a Type 2 elementary file or a Type 3 elementary file is selectively accessed. The efficiency of the booting procedure can be improved by avoiding unnecessarily accessing the body part of unused data in other types of elementary files.

10 Claims, 6 Drawing Sheets

Abbreviated dialling numbers EF ADN

| Identifier : '4FXX' | Structure: linear fixed | Conditional |
|---|---|---|
| Record length: X+14 bytes | Update activity: low | |

Access Conditions:
  READ         PIN
  UPDATE       PIN
  DEACTIVATE   ADM
  ACTIVATE     ADM

| Bytes | Description | M/O | Length |
|---|---|---|---|
| 1 to X | Alpha Identifier | O | X bytes |
| X+1 | Length of BCD number/SSC contents | M | 1 byte |
| X+2 | TON and NPI | M | 1 byte |
| X+3 to X+12 | Dialling Number/SSC String | M | 10 bytes |
| X+13 | Capability/Configuration1 Record Identifier | M | 1 byte |
| X+14 | Extension1 Record Identifier | M | 1 byte |

| Phone Book Reference file EF$_{PBR}$ |||
|---|---|---|
| Identifier : '4F30' | Structure: linear fixed | Conditional |
| Record Length: X bytes | Update activity: low ||
| Access Conditions:<br><br>READ        PIN<br>UPDATE    ADM<br>DEACTIVATE  ADM<br>ACTIVATE   ADM |||

| Bytes | Description | M/O | Length |
|---|---|---|---|
| 1 to X | TLV object(s) for indicating EFs that are part of the phone book structure | O | X bytes |

FIG. 2

Abbreviated dialling numbers EF$_{ADN}$

| Identifier : '4FXX' | Structure: linear fixed | Conditional |
|---|---|---|
| Record length: X+14 bytes | | Update activity: low |
| Access Conditions: <br> READ  PIN <br> UPDATE  PIN <br> DEACTIVATE  ADM <br> ACTIVATE  ADM | | |

| Bytes | Description | M/O | Length |
|---|---|---|---|
| 1 to X | Alpha Identifier | O | X bytes |
| X+1 | Length of BCD number/SSC contents | M | 1 byte |
| X+2 | TON and NPI | M | 1 byte |
| X+3 to X+12 | Dialling Number/SSC String | M | 10 bytes |
| X+13 | Capability/Configuration1 Record Identifier | M | 1 byte |
| X+14 | Extension1 Record Identifier | M | 1 byte |

FIG. 3

| Identifier : '4FXX' | Structure: linear fixed | Conditional |
|---|---|---|
| Record Length: X bytes | Update activity: low | |
| Access Conditions:<br><br>READ        PIN<br>UPDATE    PIN<br>DEACTIVATE  ADM<br>ACTIVATE    ADM | | |

Index administration file EF$_{IAP}$

| Bytes | Description | M/O | Length |
|---|---|---|---|
| 1 | Record number of the first object indicated after Tag 'A9' | M | 1 byte |
| 2 | Record number of the second object indicated after Tag 'A9' | C | 1 byte |
| X | Record number of the xth object indicated after Tag 'A9' | C | 1 byte |

FIG. 4

|  | 1st record | 2nd record | 3rd record | 4th record | 5th record |
|---|---|---|---|---|---|
| Master EF$_{ADN}$ | O | O | O | O | O |
| Type 1 EF$_{IAP}$ | O | O | O | O |  |
| Type 2 EF$_{EMAIL}$ | O |  | O | O |  |
| Type 3 EF$_{EXT1}$ |  | O |  |  |  |

|  |  |  |  |  |
|---|---|---|---|---|
| First lookup table | * | * | * | * |  |
| Second lookup table | * |  | * | * |  |
| Third lookup table |  | * |  |  |  |

FIG. 5

METHOD OF ACCESSING CONTACT FEATURES IN SMARTCARDS

BACKGROUND OF THE INVENTION

1. Field of the Invention

The present invention is related to a method of accessing contact features in smartcards, and more particularly, to a method of accessing elementary files associated with contact features in smartcards.

2. Description of the Prior Art

Subscriber identity module (SIM) card is a smartcard that securely stores the international mobile subscriber identity (IMSI) used to identify and authenticate subscribers, short message service (SMS) data and contact information on mobile telephony devices. The hardware structure of a SIM card includes a central process unit (CPU), read-only memory (ROM), random access memory (RAM), electrically erasable programmable read-only memory (EEPROM), and an input/output (I/O) circuit. The hierarchical logic data structure of a SIM card includes 3 types of files: elementary file (EF), dedicated file (DF) and master file (MF).

An elementary file, including a header and a body part, may adopt 3 main types of data structures for storing different types of data: transparent, linear fixed and cyclic. A transparent elementary file defines the data that is managed as a stream of bytes addressed by an offset coming from the start of the file. A linear fixed elementary file or a cyclic elementary file is the data grouped into records, which is a block of bytes with a pre-defined size. Meanwhile, the header of an elementary file marks the overall length and the number of records.

According to the 3rd Generation Partnership Project (3GPP) specification TS 31.102, various types of contact features, such as contact name, primary phone number, secondary phone number, email or contact group, may be stored in a SIM card using different elementary files. In the prior art, a user equipment is configured to access the phone book reference file elementary file $EF_{PBR}$ of its SIM card during the booting procedure, thereby acquiring all contact features supported by the SIM card and accessing the header and body part of all relevant elementary files. However, not all contacts are stored with all types of contact features. Assuming that the SIM card can support 4 types of contact features (contact name, primary phone number, secondary phone number and email) but only the primary phone number is stored for a specific contact, the prior art method still accesses the header and body part of all relevant elementary files associated with contact name, primary phone number, secondary phone number and email. Therefore, the prior art method may lower the booting efficiency.

SUMMARY OF THE INVENTION

The present invention provides a method of accessing contact features in a smartcard. The method includes inserting the smartcard in a user equipment; accessing a body part of a master elementary file stored in the smartcard during a booting procedure of the user equipment; accessing a header of a Type 1 elementary file stored in the smartcard; and accessing a first record in a body part of the Type 1 elementary file only when a relevant specific record in the body part of the master elementary file corresponds to valid data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the phone book reference file elementary file $EF_{PBR}$ defined in the 3GPP specification.

FIG. 3 is a diagram illustrating the abbreviated dialing numbers elementary file $EF_{ADN}$ defined in the 3GPP specification.

FIG. 4 is a diagram illustrating the index administration phone book elementary file $EF_{IAP}$ defined in the 3GPP specification.

FIG. 5 is a diagram illustrating a method of accessing the body part of various types of elementary files according to an embodiment of the present invention.

DETAILED DESCRIPTION

The present invention provides a method of accessing contact features in smartcards. The present method may be applied to electronic devices including, but not limited to, mobile telephones, personal digital assistants, handheld computers, tablet computers, nettop computers, or laptop computers, or other devices with similar telecommunication capabilities. However, the type of user equipment does not limit the scope of the present invention.

The present method may be applied to user equipment inserted with various types of smartcards including, but not limited to, a SIM card for global system for mobile communications (GSM) system, a USIM card for universal mobile telecommunications system (UMTS), or a removable user identity module (R-UIM) card/code division multiple access (CDMA) user identity module (CSIM) card for CDMA systems. However, the type of the smartcard does not limit the scope of the present invention.

The present method may be applied to user equipment inserted with a smartcard of various sizes including, but not limited to, a standard Mini SIM card, a Micro SIM card or a Nano SIM card. However, the size of the smartcard does not limit the scope of the present invention.

Figure 1A:
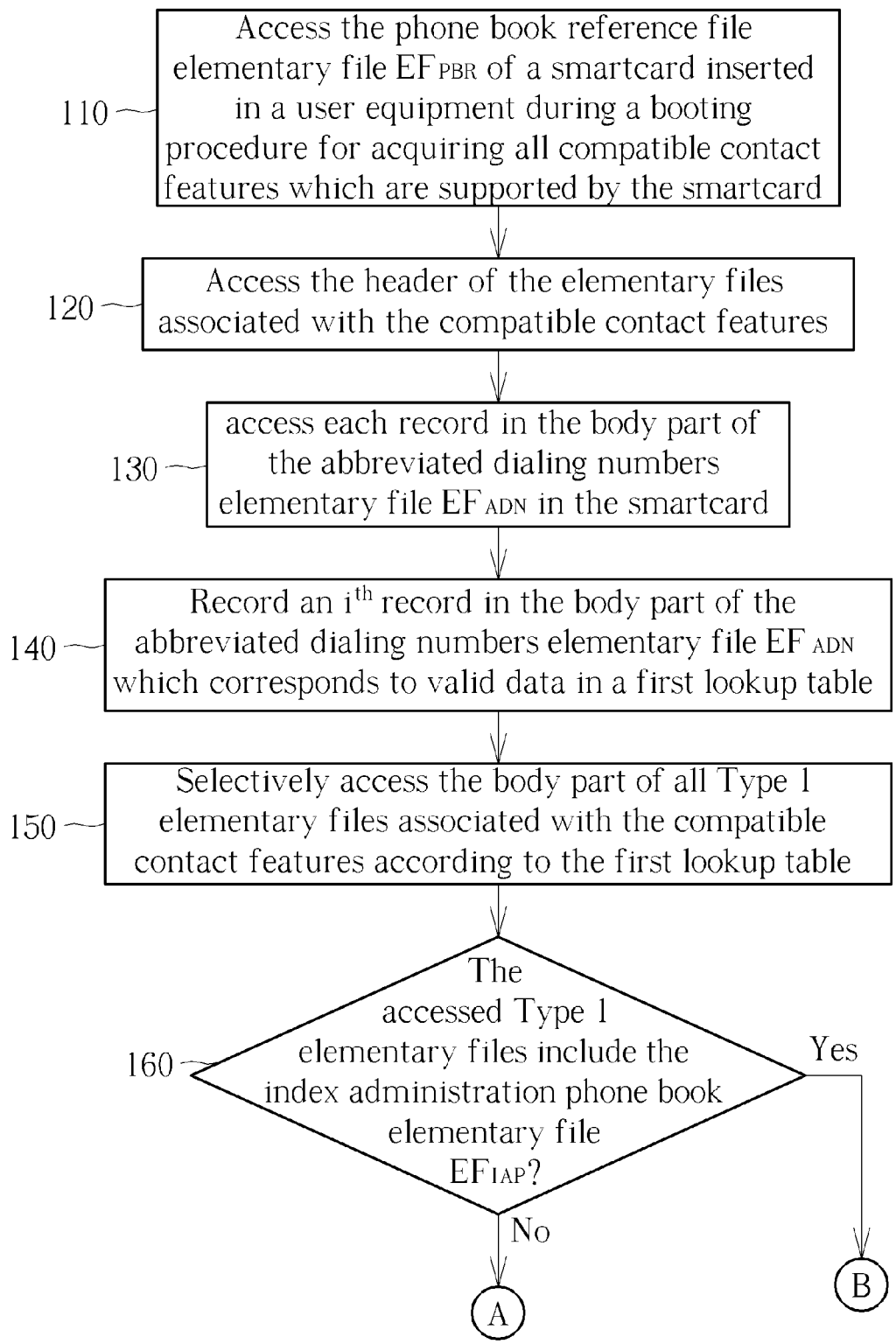
FIGS. 1A and 1B depicts a flowchart illustrating a method of accessing contact features in smartcards according to an embodiment of the present invention.
Figure 1B:
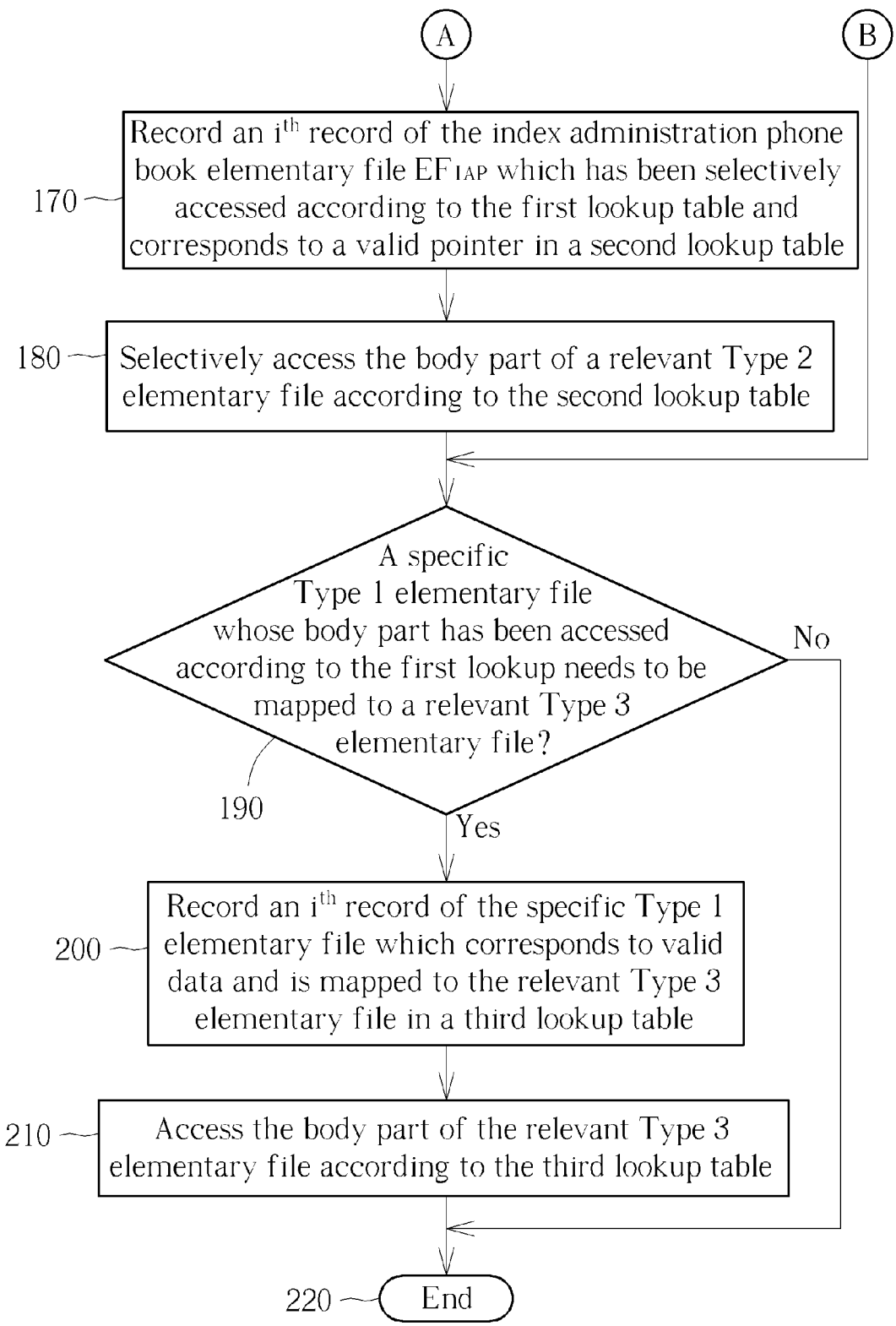

FIGS. 1A and 1B depict a flowchart illustrating a method of accessing contact features in smartcards according to an embodiment of the present invention. The flowchart in FIGS. 1A and 1B includes the following steps:

Step 110: access the phone book reference file elementary file $EF_{PBR}$ of a smartcard inserted in a user equipment during a booting procedure for acquiring all compatible contact features which are supported by the smartcard; execute step 120.

Step 120: access the header of the elementary files associated with the compatible contact features; execute step 130.

Step 130: access each record in the body part of the abbreviated dialing numbers elementary file $EF_{ADN}$ in the smartcard; execute step 140.

Step 140: record an $i^{th}$ record in the body part of the abbreviated dialing numbers elementary file $EF_{ADN}$ which corresponds to valid data in a first lookup table; execute step 150.

Step 150: selectively access the body part of all Type 1 elementary files associated with the compatible contact features according to the first lookup table; execute step 160.

Step 160: determine whether the accessed Type 1 elementary files include the index administration phone book elementary file $EF_{IAP}$: if yes, execute step 170; if no, execute step 190.

Step 170: record an $i^{th}$ record of the index administration phone book elementary file $EF_{IAP}$ which has been selectively accessed according to the first lookup table and corresponds to a valid pointer in a second lookup table; execute step 180.

Step 180: selectively access the body part of a relevant Type 2 elementary file according to the second lookup table; execute step 190.

Step 190: determine whether a specific Type 1 elementary file whose body part has been accessed according to the first lookup needs to be mapped to a relevant Type 3 elementary file: if yes, execute step 200; if no, execute step 220.

Step 200: record an $i^{th}$ record of the specific Type 1 elementary file which corresponds to valid data and is mapped to the relevant Type 3 elementary file in a third lookup table; execute step 210.

Step 210: access the body part of the relevant Type 3 elementary file according to the third lookup table; execute step 220.

Step 220: end.

FIG. 2 is a diagram illustrating the phone book reference file elementary file $EF_{PBR}$ defined in the 3GPP specification TS31.102. As depicted in field 11, bytes 1 to X (X is an integer larger than 1) are used to store the tab length value (TLV) objects for indicating elementary files which are part of the phone book structure. Other fields of the phone book reference file elementary file $EF_{PBR}$ are defined in detail in the 3GPP specification TS 31.102.

In step 110, the user equipment may access the phone book reference file elementary file $EF_{PBR}$ of its smartcard during the booting procedure and acquire all compatible contact features based on the TLV objects represented by bytes 1 to X of the phone book reference file elementary file $EF_{PBR}$. In the embodiment of the present invention, the abbreviated name and type of contact features are listed in the following table.

TABLE

| Name | Type 1 | Type 2 | Type 3 |
|---|---|---|---|
| $EF_{AAS}$ | | | X |
| $EF_{ADN}$ | X | | |
| $EF_{ANR}$ | X | X | |
| $EF_{EMAIL}$ | X | X | |
| $EF_{EXT1}$ | | | X |
| $EF_{GAS}$ | | | X |
| $EF_{GRP}$ | X | | |
| $EF_{IAP}$ | X | | |
| $EF_{PBC}$ | X | | |
| $EF_{SNE}$ | X | X | |
| $EF_{UID}$ | X | | |
| $EF_{CCP1}$ | | | X |

$EF_{AAS}$ represents an additional number Alpha string elementary file (Type 3) for storing the alpha strings associated with the user-defined naming tags for additional numbers referenced in $EF_{ANR}$. $EF_{ADN}$ represents an abbreviated dialing numbers elementary file (Type 1) whose structure will be explained in detail in subsequent paragraphs. $EF_{ANR}$ represents an additional number elementary file (Type 1 or Type 2) for storing several phone numbers and/or supplementary service control strings (SSC). $EF_{EMAIL}$ represents an electronic mail elementary file (Type 1 or Type 2) for storing an e-mail address of a contact. $EF_{EXT1}$ represents an extension1 elementary file (Type 3) for storing extension data which is greater than the 20 digit capacity of $EF_{ADN}$. $EF_{GAS}$ represents a grouping information Alpha string elementary file (Type 3) for storing the alpha strings associated with the group name referenced in $EF_{GRP}$. $EF_{GRP}$ represents a grouping file elementary file (Type 1) for storing the grouping information for each phone book entry in $EF_{ADN}$. $EF_{IAP}$ represents an index administration phone book elementary file (Type 1) for storing the pointers which are used to link to other Type 2 elementary files. $EF_{PBC}$ represents a phone book control elementary file (Type 1) for storing control information related to each entry in $EF_{ADN}$. $EF_{SNE}$ represents a second name entry elementary file (Type 1 or Type 2). $EF_{UID}$ represents a unique identifier elementary file (Type 1). $EF_{CCP1}$ represents a capability configuration parameters 1 elementary file (Type 3).

In the phone book reference file elementary file $EF_{PBR}$, the first file ID in the first record indicated using constructed Tag 'A8' is called a master EF. Subsequent file IDs indicated using constructed Tag 'A8' correspond to a Type 1 EF. File IDs indicated using constructed Tag 'A9' correspond to a Type 2 EF. File IDs indicated using constructed Tag 'AA' correspond to a Type 3 EF. According to the 3GPP specification TS31.102, the abbreviated dialing numbers elementary file $EF_{ADN}$ is a master EF. A Type 1 EF and a master EF contain the same number of records, and each record in the Type 1 EF is mapped to a corresponding record in the master EF on a one-to-one basis. A Type 2 EF contains fewer records than a master EF, and each record in the Type 2 EF is mapped to a corresponding record in the master 1 EF by a pointer indicated in the Type 1 index administration phone book elementary file $EF_{IAP}$. Each record in a Type 3 EF is mapped to a corresponding record in the master EF by a record identifier with a record of the phone book reference file elementary file $EF_{PBR}$.

In step 120, the user equipment may access the header of the elementary files associated with the compatible contact features, thereby determining the number and the length of data which can be written into each elementary file.

In step 130, the user equipment may access each record in the body part of the abbreviated dialing numbers elementary file $EF_{ADN}$ in the smartcard. FIG. 3 is a diagram illustrating the abbreviated dialing numbers elementary file $EF_{ADN}$ defined in the 3GPP specification TS 31.102. As depicted in field 12, bytes 1 to X (X is an integer larger than 1) are used to store the Alpha-tagging of the associated first to the $X^{th}$ dialing numbers. As depicted in field 13, bytes X+3 to X+12 are used to store up to 20 digits of the telephone number and/or SSC information. As depicted in field 14, byte X+13 is used to store capability/configuration identification byte which identifies the number of a record in the $EF_{CCP1}$ containing associated capability/configuration parameters required for the call. As depicted in field 15, byte X+14 is used to store extension1 record identification byte which identifies the number of a record in the $EF_{EXT1}$ containing an associated called party sub-address or additional data. Other fields of the abbreviated dialing numbers elementary file $EF_{ADN}$ are defined in detail in the 3GPP specification TS 31.102.

As previously stated, each record in the master abbreviated dialing numbers elementary file $EF_{ADN}$ is mapped to a corresponding record in another Type 1 EF on a one-to-one basis. When the $i^{th}$ record in the body part of the abbreviated dialing numbers elementary file $EF_{ADN}$ corresponds to valid data (any value other than "FF"), the corresponding $i^{th}$ record in the body part of the another Type 1 EF also corresponds to valid data. Therefore, the user equipment may record the $i^{th}$ record in the body part of the abbreviated dialing numbers elementary file $EF_{ADN}$ which corresponds to valid data in the first lookup table in step 140.

In step 150, the user equipment may selectively access the body part of all Type 1 elementary files associated with the compatible contact features according to the first lookup table. More specifically, the above-mentioned selective access is based on whether corresponding entries exist in the first lookup table. For example, in the body part of the abbreviated dialing numbers elementary file $EF_{ADN}$, if the $i^{th}$ record of corresponds to valid data but the $(i+1)^{th}$ record corresponds to invalid data, only an $i^{th}$ entry (containing the $i^{th}$ record in the body part of the abbreviated dialing numbers elementary file $EF_{ADN}$ recorded in step 140) exits in the first lookup table, while an $(i+1)^{th}$ entry of the first lookup table is empty. Therefore, the user equipment may access the $i^{th}$ record in the body part of all Type 1 elementary files associated with the compatible contact features, but does not access the $(i+1)^{th}$ record in the body part of all Type 1 elementary files associated with the compatible contact features.

FIG. 4 is a diagram illustrating the index administration phone book elementary file $EF_{IAP}$ defined in the 3GPP specification TS31.102. As depicted in field 16, bytes 1 to X (X is an integer larger than 1) represent record numbers of the first to $X^{th}$ objects indicated after Tag 'A9'. Other fields of the index administration phone book elementary file $EF_{IAP}$ are defined in detail in the 3GPP specification TS 31.102.

If the index administration phone book elementary file $EF_{IAP}$ is indicated as a compatible contact feature based on the phone book reference file elementary file $EF_{PBR}$ accessed in step 110, step 150 is then executed for selectively accessing the body part of the index administration phone book elementary file $EF_{IAP}$. It may then be determined in step 160 that the accessed Type 1 elementary files include the index administration phone book elementary file $EF_{IAP}$. According to the 3GPP specification TS31.102, the $i^{th}$ record in the body part of the index administration phone book elementary file $EF_{IAP}$ with any value other than "FF" corresponds to a valid pointer, which means a corresponding Type 2 elementary file needs to be mapped to the $i^{th}$ record in the abbreviated dialing numbers elementary file $EF_{ADN}$; the $i^{th}$ record in the body part of the index administration phone book elementary file $EF_{IAP}$ with a value of "FF" corresponds to an invalid pointer, which means no Type 2 elementary file needs to be mapped to the $i^{th}$ record in the abbreviated dialing numbers elementary file $EF_{ADN}$. Therefore, the user equipment may record each record of the index administration phone book elementary file $EF_{IAP}$ which corresponds to a valid pointer in the second lookup table in step 170, and then selectively access the body part of a relevant Type 2 elementary file according to the second lookup table in step 180.

After selectively accessing the body part of a specific Type 1 elementary file according to the first lookup table, it may be determined in step 190 whether the specific Type 1 elementary file needs to be mapped to a relevant Type 3 elementary file.

In an embodiment, the specific Type 1 elementary file may be the Type 1 abbreviated dialing numbers elementary file $EF_{ADN}$. When the $i^{th}$ record in the body part of the abbreviated dialing numbers elementary file $EF_{ADN}$ corresponds to valid data, it may be determined whether the $i^{th}$ record in the body part of the abbreviated dialing numbers elementary file $EF_{ADN}$ needs to be mapped to a relevant specific Type 3 elementary file according to specific bytes of the valid data. More specifically, in the $i^{th}$ record of the abbreviated dialing numbers elementary file $EF_{ADN}$ which corresponds to valid data, when byte X+13 (capability/configuration 1 identification byte) corresponds to valid data, the $i^{th}$ record of the abbreviated dialing numbers elementary file $EF_{ADN}$ needs to be mapped to a specific record in the Type 3 capability configuration parameters 1 elementary file $EF_{CCP1}$; when byte X+14 (extension1 record identification byte) corresponds to valid data, the $i^{th}$ record of the abbreviated dialing numbers elementary file $EF_{ADN}$ needs to be mapped to a specific record in the Type 3 extension1 elementary file $EF_{EXT1}$. Therefore, the user equipment may record each record of the Type 1 abbreviated dialing numbers elementary file $EF_{ADN}$ which needs to be mapped to the specific Type 3 elementary file in the third lookup table record in step 200, and then selectively access the body part of the extension1 elementary file $EF_{EXT1}$ and/or the capability configuration parameters 1 elementary file $EF_{CCP1}$ according to the third lookup table in step 210.

In another embodiment, the specific Type 1 elementary file may be the Type 1 additional number elementary file $EF_{ANR}$ which may be required to be mapped to the Type 3 additional number Alpha string elementary file $EF_{AAS}$. Therefore, the user equipment may record each record of the Type 1 additional number elementary file $EF_{ANR}$ which needs to be mapped to the Type 3 additional number Alpha string elementary file $EF_{AAS}$ in the third lookup table record in step 200, and then selectively access the body part of the Type 3 additional number Alpha string elementary file $EF_{AAs}$ according to the third lookup table in step 210.

In yet another embodiment, the specific Type 1 elementary file may be the Type 1 grouping file elementary file $EF_{GRP}$ which may be required to be mapped to the Type 3 grouping information Alpha string elementary file $EF_{GAS}$. Therefore, the user equipment may record each record of the Type 1 grouping file elementary file $EF_{GRP}$ which needs to be mapped to the Type 3 grouping information Alpha string elementary file $EF_{GAS}$ in the third lookup table record in step 200, and then selectively access the body part of the Type 3 grouping information Alpha string elementary file $EF_{GAS}$ according to the third lookup table in step 210.

According to the first lookup table, the user equipment is configured to access an $i^{th}$ record in the body part of a Type 1 elementary file only when a corresponding $i^{th}$ record in the body part of the abbreviated dialing numbers elementary file $EF_{ADN}$ corresponds to valid data. If the $i^{th}$ record in the body part of the abbreviated dialing numbers elementary file $EF_{ADN}$ does not correspond to valid data, the user equipment does not access the $i^{th}$ record in the body part of a Type 1 elementary file.

According to the second lookup table, the user equipment is configured to access an $i^{th}$ record in the body part of a Type 2 elementary file only when a corresponding $i^{th}$ record in the body part of the index administration phone book elementary file $EF_{IAP}$ corresponds to a valid pointer. If the $i^{th}$ record in the body part of the index administration phone book elementary file $EF_{IAP}$ does not correspond to a valid pointer, the user equipment does not access the $i^{th}$ record in the body part of a Type 2 elementary file.

According to the third lookup table, the user equipment is configured to access an $i^{th}$ record in the body part of a Type 3 elementary file only when a corresponding $i^{th}$ record in the body part of a specific Type 1 elementary file corresponds to valid data and includes specific bytes indicative of a valid link. If the $i^{th}$ record in the body part of the specific Type 1 elementary file corresponds to valid data but does not include specific bytes indicative of a valid link, the user equipment does not access the $i^{th}$ record in the body part of a Type 3 elementary file.

FIG. 5 is a diagram illustrating a method of accessing the body part of various types of elementary files according to an embodiment of the present invention. For illustrative purpose, it is assumed that the compatible contact features of the smartcard acquired in step 100 at least includes contact number, contact email and contact group. In other words, the relevant elementary files includes the Type 1 abbreviated dialing numbers elementary file $EF_{ADN}$, the Type 2 index administration phone book elementary file $EF_{IAP}$, the Type 2 electronic mail elementary file $EF_{EMAIL}$, and the Type 3 extension1 elementary file $EF_{EXT1}$. In step 120, it is assumed that the body part in each of the above-mentioned elementary files includes 5 records. The method of accessing the body part of various types of elementary files according to steps 130, 180 and 210 is depicted on the top of FIG. 5. The lookup tables recorded according to steps 140, 170 and 200 are depicted on the bottom of FIG. 5.

According to the first lookup table depicted in FIG. 5, the $1^{st}$ to $4^{th}$ records of the master abbreviated dialing numbers elementary file $EF_{ADN}$ correspond to valid data (marked by star sign "*") and the $5^{th}$ record of the master abbreviated dialing numbers elementary file $EF_{ADN}$ corresponds to invalid data. Therefore, the present invention only accesses the $1^{st}$ to $4^{th}$ records in the body part of the Type 1 index administration phone book elementary file $EF_{IAP}$ (marked by circle "○"), but does not accesses the $5^{th}$ record in the body part of the Type 1 index administration phone book elementary file $EF_{IAP}$.

According to the second lookup table depicted in FIG. 5, the $1^{st}$, $3^{rd}$ and $4^{th}$ records of the Type 1 index administration phone book elementary file $EF_{IAP}$ correspond to valid pointers (marked by star sign "*") and the $2^{nd}$ record of the Type 1 index administration phone book elementary file $EF_{IAP}$ corresponds to an invalid pointer. Therefore, the present invention only accesses the $1^{st}$, $3^{rd}$ and $4^{th}$ records in the body part of the Type 2 electronic mail elementary file $EF_{EMAIL}$ (marked by circle "○"), but does not accesses the $2^{nd}$ and $5^{th}$ records in the body part of the Type 2 electronic mail elementary file $EF_{EMAIL}$.

According to the third lookup table depicted in FIG. 5, the records of the master abbreviated dialing numbers elementary file $EF_{ADN}$ which correspond to valid data only need to be mapped to the $2^{nd}$ record of the Type 3 extension1 elementary file $EF_{EXT1}$ (marked by star sign "*"). Therefore, the present invention only accesses the $2^{nd}$ record in the body part of the Type 3 extension1 elementary file $EF_{EXT1}$ (marked by circle "○"), but does not accesses the $1^{st}$, $3^{rd}$, $4^{th}$ and $5^{th}$ records in the body part of the Type 3 extension1 elementary file $EF_{EXT1}$.

Under the same circumstance, the prior art method would access all of the 20 records in the body parts of elementary files $EF_{ADN}$, $EF_{IAP}$, $EF_{EMAIL}$ and $EF_{EXT1}$ during the booting procedure. In comparison, the present method only needs to access the 13 records in the body parts of elementary files $EF_{ADN}$, $EF_{IAP}$, $EF_{EMAIL}$ and $EF_{EXT1}$ which are actually in use, thereby improving the efficiency of the booting procedure.

In conclusion, the present method selectively access the body part of various types of elementary files according to the validity and link of each record in the master abbreviated dialing numbers elementary file $EF_{ADN}$. Therefore, the efficiency of the booting procedure can be improved by avoiding unnecessarily accessing the body part of unused data in other types of elementary files Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of accessing contact features in a smartcard, comprising:
   inserting the smartcard in a user equipment;
   accessing a body part of a master elementary file stored in the smartcard during a booting procedure of the user equipment;
   accessing a header of a Type 1 elementary file stored in the smartcard;
   accessing a first record in a body part of the Type 1 elementary file only when a relevant specific record in the body part of the master elementary file corresponds to valid data; and
   accessing a second record in a body part of a Type 2 elementary file stored in the smartcard when the relevant first record in the body part of the Type 1 elementary file corresponds to a valid pointer.

2. The method of claim 1, wherein the master elementary file is an abbreviated dialing numbers elementary file defined in a 3rd Generation Partnership Project (3GPP) specification TS 31.102.

3. The method of claim 1, wherein the Type 1 elementary file is an additional number elementary file, a grouping file elementary file, an index administration phone book elementary file, a phone book control elementary file, a second name entry elementary file, or a unique identifier elementary file defined in a 3rd Generation Partnership Project (3GPP) specification TS 31.102.

4. The method of claim 1, wherein:
   the Type 1 elementary file is an index administration phone book elementary file defined in a 3rd Generation Partnership Project (3GPP) specification TS 31.102; and
   the Type 2 elementary file is an additional number elementary file, an electronic mail elementary file, or a second name entry elementary file defined in the 3GPP specification TS 31.102.

5. The method of claim 1, further comprising:
   accessing a phone book reference file elementary file defined in a 3rd Generation Partnership Project (3GPP) specification TS 31.102 for acquiring one or multiple contact features supported by the smartcard, wherein the master elementary file and the Type 1 elementary file are associated with the one or multiple contact features.

6. The method of claim 5, further comprising:
   recording all records in the body part of the master elementary file which correspond to valid data in a first lookup table;
   selectively accessing the body part of the Type 1 elementary file according to the first lookup table;
   recording all records in the body part of the master elementary file which correspond to valid pointers in a second lookup table;
   selectively accessing a body part of a Type 2 elementary file according to the second lookup table;
   recording all records in the body part of the master elementary file which correspond to valid data and include specific bytes indicative of a valid link in a third lookup table; and selectively accessing a body part of a Type 3 elementary file according to the third lookup table, wherein the Type 2 elementary file and the Type 3 elementary file are associated with the one or multiple contact features.

7. A method of accessing contact features in a smartcard, comprising:
   inserting the smartcard in a user equipment;
   accessing a body part of a master elementary file stored in the smartcard during a booting procedure of the user equipment;
   accessing a header of a Type 1 elementary file stored in the smartcard;
   accessing a first record in a body part of the Type 1 elementary file only when a relevant specific record in the body part of the master elementary file corresponds to valid data; and
   accessing a second record in a body part of a Type 3 elementary file stored in the smartcard when the specific record in the body part of the master elementary file corresponds to valid data and includes a specific byte indicative of a valid link.

8. The method of claim 7, wherein the Type 3 elementary file is an additional number Alpha string elementary file, an extension1 elementary file, a grouping information Alpha string elementary file, or a capability configuration parameters 1 elementary file defined in a 3rd Generation Partnership Project (3GPP) specification TS 31.102.

9. A method of accessing contact features in a smartcard, comprising:
   inserting the smartcard in a user equipment;
   accessing a body part of a master elementary file stored in the smartcard during a booting procedure of the user equipment;
   accessing a header of a Type 1 elementary file stored in the smartcard;
   accessing a first record in a body part of the Type 1 elementary file only when a relevant specific record in the body part of the master elementary file corresponds to valid data; and
   accessing a second record in a body part of a Type 3 elementary file stored in the smartcard when the specific record in the body part of the master elementary file includes a specific byte indicative of a valid link.

10. The method of claim 9, wherein:
    the Type 3 elementary file is an additional number Alpha string elementary file defined in a 3rd Generation Partnership Project (3GPP) specification TS 31.102 when the Type 1 elementary file is an additional number elementary file defined in the 3GPP specification TS 31.102; and
    the Type 3 elementary file is a grouping information Alpha string elementary file defined in the 3GPP specification TS 31.102 when the Type 1 elementary file is a grouping information Alpha string elementary file defined in the 3GPP specification TS 31.102.

* * * * *